United States Patent
Von Wendorff

(10) Patent No.: US 6,986,079 B2
(45) Date of Patent: Jan. 10, 2006

(54) MEMORY DEVICE METHOD FOR OPERATING A SYSTEM CONTAINING A MEMORY DEVICE FOR FAULT DETECTION WITH TWO INTERRUPT SERVICE ROUTINES

(75) Inventor: Wilhard Christophorus Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 552 days.

(21) Appl. No.: 10/199,641

(22) Filed: Jul. 19, 2002

(65) Prior Publication Data

US 2003/0033562 A1 Feb. 13, 2003

(30) Foreign Application Priority Data

Jul. 19, 2001 (DE) .......................... 101 35 285

(51) Int. Cl.
*G06F 11/00* (2006.01)

(52) U.S. Cl. .............................. 714/42; 714/5; 714/37; 714/718; 714/49

(58) Field of Classification Search .................... 714/5, 714/37, 38, 42, 49, 54, 718
See application file for complete search history.

(56) References Cited

U.S. PATENT DOCUMENTS

| | | | |
|---|---|---|---|
| 3,828,324 A | 8/1974 | Vigil et al. | |
| 4,349,873 A | 9/1982 | Gunter et al. | |
| 4,620,303 A * | 10/1986 | Tschoepe | 714/25 |
| 5,177,747 A | 1/1993 | Capps, Jr. et al. | |
| 5,274,646 A | 12/1993 | Brey et al. | |
| 5,367,494 A * | 11/1994 | Shebanow et al. | 365/230.03 |
| 6,405,322 B1 * | 6/2002 | Gaither et al. | 714/5 |
| 6,430,717 B1 * | 8/2002 | Noji | 714/718 |
| 6,629,273 B1 * | 9/2003 | Patterson | 714/718 |
| 6,766,466 B1 * | 7/2004 | Jibbe | 714/4 |
| 2002/0133766 A1 * | 9/2002 | Batten et al. | 714/718 |

OTHER PUBLICATIONS

Dr Weigand, Ulrich, "Understanding Linux Memory Management", linuxvm.org/present/SHARE102/s9241uw.pdf, Feb. 23, 2004, all pages.*

* cited by examiner

*Primary Examiner*—Nadeem Iqbal
*Assistant Examiner*—Timothy M. Bonura
(74) *Attorney, Agent, or Firm*—Laurence A. Greenberg; Werner H. Stemer; Ralph E. Locher

(57) ABSTRACT

A method operates a system with a program-controlled unit. The program-controlled unit reads and executes data that are stored in a memory device and that represents instructions. According to the method, a check is made during the reading of data from the memory device to determine whether the relevant data are error-free. When it is ascertained that the relevant data are not error-free, the execution of an interrupt service routine is initiated. The method is distinguished by the fact that, when it is ascertained, during the execution of the interrupt service routine, that the data that are to be read from the memory device for this purpose is not error-free, the execution of the interrupt service routine is interrupted or ended, and the execution of an interrupt service routine stored at a different location is initiated. The memory device described has an error detection device that outputs an interrupt request signal if the stored data are erroneous, and that outputs a different interrupt request signal if it again discovers an error during the execution of the interrupt service routine.

13 Claims, 1 Drawing Sheet

MEMORY DEVICE METHOD FOR OPERATING A SYSTEM CONTAINING A MEMORY DEVICE FOR FAULT DETECTION WITH TWO INTERRUPT SERVICE ROUTINES

BACKGROUND OF THE INVENTION

Field of the Invention

The invention relates to a method for operating a system with a program-controlled unit. Such methods include reading and executing data stored in a memory device and represent instructions; determining whether the relevant data are error-free while reading the data from the memory device; when the data are not error-free; ending the program currently being executed by using the program-controlled unit being interrupted; and initiating an interrupt service routine.

The invention also relates to a memory device for storing data. Such memory devices typically include an error detection device that, during the read-out of data from the memory device, checks whether the relevant data are error-free, and that outputs an interrupt request signal when it ascertains that the relevant data are not error-free.

Storing erroneous data in a memory device is an infrequent, yet serious, problem. This applies particularly to systems whose failure or malfunction represents a high safety risk. An example of such a system is an antilock braking system in a motor vehicle. A malfunction or a failure of the control device of the antilock braking system may prevent the vehicle can from braking, or at least braking normally.

For this reason, in systems that must not be in an undefined state, corresponding precautions are taken against the occurrence of such malfunctions or failures.

These precautions may include determining whether the data read from a memory device are error-free, and, when it is ascertained that this is not the case, prompting a program-controlled unit contained in the system with an interrupt request to interrupt or end the program that is currently being executed and to execute an interrupt service routine.

Determining whether or not the data read from the memory device are error-free is effected using a special code, for example using, a so-called CRC (cyclic redundancy code) or a so-called ECC (error correction code). The CRC can be stored together with the data that are actually to be stored in the memory device, or in a different memory device. An error detection device that is normally provided in the memory device uses the special code to check whether the data that are to be output from the memory device are error-free, and indicates by the outputting of corresponding data or signals (for example by the outputting of an interrupt request signal) if this is not the case.

If the error detection device indicates that the data stored in the memory device is erroneous, the program-controlled unit reacts to this by executing a specific program: for example, by executing an interrupt service routine. In this specific program, measures are taken which bring the device that is to be controlled by the program-controlled unit into a defined state.

Experience shows that the device to be controlled cannot always be brought into a defined state in this way.

SUMMARY OF THE INVENTION

It is accordingly an object of the invention to provide a memory device and method for operating a system containing a memory device that overcome the hereinaforementioned disadvantages of the heretofore-known devices of this general type and that bring a system into a defined state with the greatest possible probability when data stored in a memory device is erroneous.

With the foregoing and other objects in view, there is provided, in accordance with the invention, a method for operating a system with a program-controlled unit. The first step of the method is reading data stored in a memory device. The data represent instructions of a program. The next step is executing the program with the program-controlled unit. The next step is determining whether the data being read are error-free during the reading step. The next step is, when the data have been determined not to be error-free, interrupting, or even ending, the executing of the program and executing a first interrupt service routine. The next step is, during the executing of the interrupt service routine, when the data being read from the memory device are still not error-free, interrupting the executing of the interrupt service routine and executing a second interrupt service routine stored at a different location.

The method according to the invention is distinguished by the fact that, when it is ascertained, during the execution of the interrupt service routine, that the data that are to be read from the memory device for this purpose is not error-free, the execution of the interrupt service routine is interrupted or ended, and the execution of an interrupt service routine stored at a different location is initiated.

With the objects of the invention in view, there is also provided a memory device system for storing data. The system includes a memory device and an error detection device. The memory device is for storing data. The error detection device reads the data from the memory device, checks whether the data are error-free, outputs a first interrupt request signal when the data are not error-free, and outputs a second interrupt request signal differing from the first output interrupt request signal when the error detection device ascertains that the data read from the memory device are not error-free during the execution of the interrupt service routine that is executed in response to the outputting of the interrupt request signal.

The memory device according to the invention is distinguished by the fact that, when the error detection device ascertains, during the execution of the interrupt service routine that is executed in response to the outputting of the interrupt request signal, that the data read from the memory device for this purpose are not error-free, the error detection device outputs an interrupt request signal that differs from the previously output interrupt request signal.

As a result, a plurality of different attempts can be performed successively in order to keep the system running properly or to bring it into a defined state.

Advantageous developments of the invention can be gathered from the subclaims, the description below, and the figures.

Other features that are considered as characteristic for the invention are set forth in the appended claims.

Although the invention is illustrated and described herein as embodied in a memory device and method for operating a system containing a memory device, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
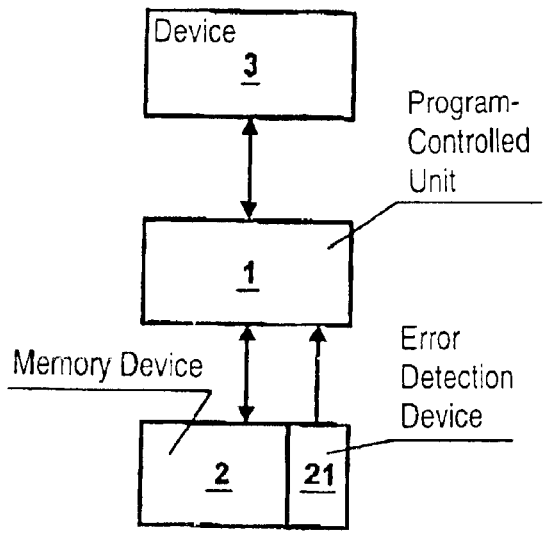
FIG. 1 is a block diagram showing the basic construction of the system according to the invention.

Referring now to the figures of the drawings in detail and first, particularly to FIG. 1 thereof, there is shown the system considered in the present case. The system includes a program-controlled unit 1, a memory device 2, and a device 3 controlled by the program-controlled unit 1.

Only the constituent parts of the system considered that are of particular interest in the present case are shown in FIG. 1.

In the example considered, the program-controlled unit 1 is a microcontroller. However, a different program-controlled unit, for example a microprocessor or a signal processor, could also be involved.

The device 3 controlled by the microcontroller 1 is preferably an airbag of a motor vehicle in the example considered. However, an arbitrary other device in a motor vehicle could also be involved, for example the valves of an antilock braking system, or an injection pump. The device 3 and/or the system containing it may, of course, also be devices or systems provided outside motor vehicles.

In the example considered, the memory device 2 is provided outside the microcontroller 1. However, it may also be part of the microcontroller 1.

In the example considered, the memory device 2 is a flash memory, but may also be an arbitrary other memory device, for example a RAM, a ROM, an EEPROM, a magnetic memory, or an optical memory. In the example considered, the memory device 2 is a program memory in which the instructions to be executed by the microcontroller 1 are stored. However, a data memory or a combined program and data memory could also be involved.

The data stored in the memory device 2 are stored there together with a special code that can be used to determine whether the stored data are the data originally written to the memory device. In the example considered, the code is the CRC (cyclic redundancy code) or ECC (error correction code). It is also possible, of course, to use other codes that can detect or eliminate errors.

The memory device 2 contains an error detection device 21, that, using the special code or in some other way, checks whether the data to be output are error-free, and that, when it ascertains that this is not the case, outputs an interrupt request which prompts the microcontroller 1 to interrupt or end the execution of the program currently being executed by the microcontroller, and to begin the execution of a specific interrupt service routine.

In normal operation, the microcontroller 1 reads from the memory device 2 data representing instructions and, if appropriate, operands required for instruction execution, and executes them. The error detection device 21 checks whether the data to be output from the memory device 2 are error-free, and does nothing if the relevant data are error-free, or outputs an interrupt request signal if the data are erroneous.

The interrupt request signal output by the error detection device 21 is preferably assigned the highest priority, so that the microcontroller 1 immediately interrupts the execution of the program that is currently being executed and begins the execution of the interrupt service routine assigned to the interrupt request signal.

In the example considered, the interrupt service routine is likewise stored in the memory device 2, but in a different area than the program that is interrupted or ended by the execution of the interrupt service routine. Different area is to be understood as an area that can be erased and written to independently of the memory area in which the erroneous data are stored. However, the interrupt service routine could also be stored in a memory device other than the memory device 2.

As a result, there are realistic chances that the data representing the interrupt service routine instructions are error-free and the interrupt service routine can be executed properly despite the fact that the data stored in the memory device 2 are partly erroneous.

The same operations proceed during the execution of the interrupt service routine as during the execution of the program that is interrupted or ended by the execution of said routine. In other words, during the execution of the interrupt service routine, too, the error detection device 21 checks whether the data to be output are error-free. The error detection device 21 outputs a second interrupt request signal if the data are not error-free. The second interrupt request signal differs from the previously output interrupt request signal. As a result, the microcontroller is prompted to interrupt or end the execution of the program currently being executed (the interrupt service routine) and to begin the execution of a further interrupt service routine. This interrupt service routine is stored in a different area of the memory device 2 than the interrupt service routine thereby interrupted or ended and the program interrupted or ended by this. Different area is to be understood as an area that can be erased and written to independently of the areas that store the previously interrupted programs. However, the interrupt service routine to be executed could also be stored in a different memory device.

The same operations may proceed during the execution of this further interrupt service routine as during the execution of the first interrupt service routine: a third interrupt service routine, which is executed in response to the occurrence of an error, is once again stored in a different area of the memory device 2.

The operations described above are illustrated in FIG. 2.

Figure 2:
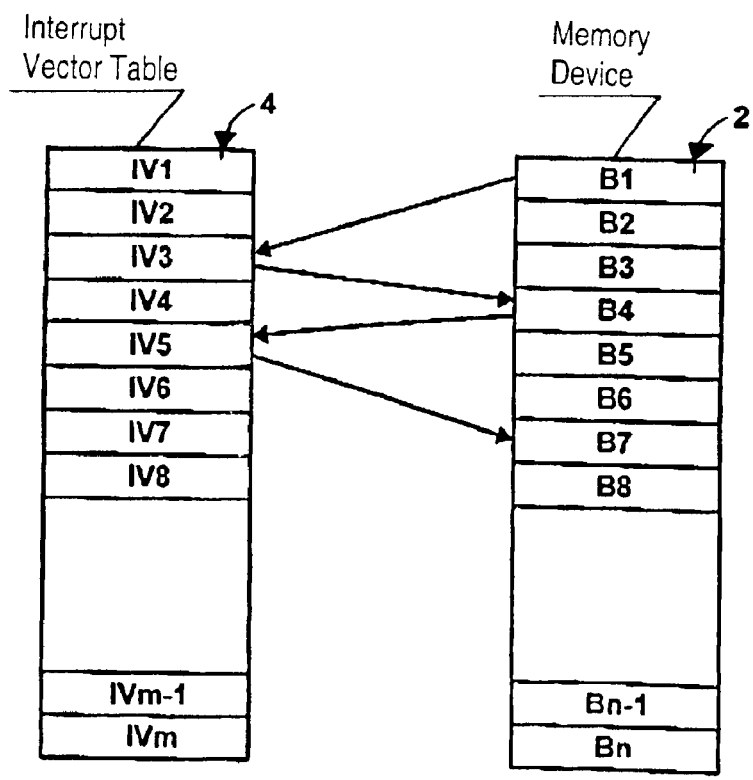
FIG. 2 is a schematic drawing showing a method according to the invention involving a memory device and an interrupt vector table that occurs when data that are requested from a memory device is erroneous.

FIG. 2 shows the memory device 2 and an interrupt vector table 4.

The memory device 2 includes n areas B1 to Bn, which can each be erased and written to independently of one another. Stored in the interrupt vector table 4 are m interrupt vectors IV1 to IVm, which define what interrupt request is assigned what interrupt service routine.

It shall be assumed that the program that is to be executed in the undisturbed normal case is stored in the area B1 of the memory device 2.

If the error detection device 21 ascertains, during the readout of data (instructions) from the area B1, that the data are not error-free, it outputs a first interrupt request signal.

This first interrupt request signal shall be assigned the interrupt vector IV3. This interrupt vector shall determine that the assigned interrupt service routine is stored in the area B4 of the memory device 2.

Consequently, after the occurrence of an error, the program-controlled unit executes an interrupt service routine stored in the area B4 of the memory device 2.

If the error detection device 21 ascertains, during the read-out of data (instructions) from the area B4, that the data are not error-free, it outputs a second interrupt request signal.

This second interrupt request signal shall be assigned the interrupt vector IV5, and this interrupt vector shall determine that the assigned interrupt service routine is stored in the area B7 of the memory device 2.

Consequently, after the occurrence of an error, the program-controlled unit executes an interrupt service routine stored in the area B7 of the memory device 2.

Provision may also be made for interrupting this interrupt service routine and subsequently executed interrupt service routines and executing interrupt service routines stored in other areas of the memory device 2.

In the example considered, the error detection device outputs different interrupt request signals. In other words, the first interrupt request signal output after the occurrence of the first error, the second interrupt request signal output after the occurrence of the second error, and, if appropriate, further interrupt request signals output after the occurrence of further errors differ from one another. The different interrupt request signals are assigned different interrupt vectors, and the different interrupt vectors are assigned different interrupt service routines. As a result, the different interrupt request signals initiate the execution of interrupt service routines that are stored in different areas of the memory device 2.

In order that the error detection device 21 can output different interrupt request signals, more precisely the correct interrupt request signal at the correct point in time, it must take into account, during the outputting of an interrupt request signal, whether and, if appropriate, how many errors have already occurred previously. This can be done, for example, by the number of errors, more precisely the number of previously output interrupt request signals, being counted in the error detection device 21.

One possible alternative to this consists in the fact that the error detection device 21 always outputs the same interrupt request signal, and that an assignment device is provided which always assigns other interrupt vectors to the interrupt request signals depending on the number of interrupt request signals that have previously been output by the error detection device 21.

The interrupt service routines preferably include the following:

a copy of the currently interrupted or ended program or program part, or a routine which brings the device 3 into a defined state, or a routine that stops or resets the program-controlled unit.

In the example considered, the interrupt service routine that is executed in response to the first interrupt request signal is a copy of the currently executed program or program part.

The interrupt service routine that is executed in response to the second interrupt request signal is a routine that brings the device to be controlled into a defined (safe) state.

However, it would also be conceivable for the interrupt service routine that is executed in response to the first interrupt request signal already to be a routine that brings the device to be controlled into a defined (safe) state, and for the interrupt service routine that is executed in response to the second interrupt request signal to be a copy of the interrupt service routine that is executed in response to the first interrupt request signal.

It should prove to be advantageous if, after a specific number of errors, in particular if one or more interrupt service routines by which the device to be controlled is intended to be brought into a defined (safe) state are also erroneous, a signal, for example a non-maskable interrupt or a non-maskable reset, is generated. This signal stops or resets the microcontroller 1.

The contents of the interrupt service routines may also be chosen arbitrarily differently than in the examples mentioned above. Which of the existing possibilities is the best depends on the respective individual case. What is important primarily is that the program that is executed after the occurrence of an error is stored in an area of the memory device 2 that can be erased and written to independently of the area that stores the erroneous program. As a result, programs that are executed in response to the occurrence of an error most probably will be executed properly.

If the interrupt service routine that is executed after the occurrence of an error is a copy of the currently interrupted program or program part, and if the program structure and the device 3 to be controlled allow the interrupted program or the interrupted program part to be interrupted and subsequently executed anew, there is even a great probability that the control of the device to be controlled can be resumed properly.

The explanations above always mentioned the fact that the error detection device outputs an interrupt request signal when it detects an error. For the sake of completeness, it shall be pointed out that what is regarded as an error depends on the respective individual case. The outputting of an interrupt request signal can be instigated both by a non-correctable error and by a correctable error.

In the manner described, it is possible with very great probability, independently of the details of the practical realization, to continue to operate systems normally, or bring them into a defined state, when memory errors occur.

I claim:

1. A method for operating a system with a program-controlled unit, which comprises:

reading data stored in a memory device, the data representing instructions of a program;

storing a first interrupt service routine and a second interrupt service routine at different locations;

executing the program with the program-controlled unit;

determining during the reading step whether the data being read are error-free;

when the data have been determined not to be error-free, interrupting the executing of the program and executing the first interrupt service routine;

during the executing of the interrupt service routine, when the data being read from the memory device are still not error-free, interrupting the executing of the interrupt service routine and executing the second interrupt service routine.

2. The method according to claim 1, which further comprises storing the first interrupt service routine in an area of the memory device that can be erased and overwritten independently of an area of the memory device storing the interrupted program.

3. The method according to claim 1, which further comprises storing the second interrupt service routine in an area of the memory device that can be erased and overwritten independently of an area of the memory device storing the first interrupt service routine.

4. The method according to claim 3, which further comprises storing the second interrupt service routine in an area of the memory device that can be erased and overwritten independently of an area storing the program being executed prior to the first interrupt service routine.

5. The method according to claim 1, which further comprises performing the determining step with an error detection device.

6. The method according to claim 5, which further comprises integrating the error detection device in the memory device.

7. The method according to claim 5, which further comprises outputting an interrupt request signal from the error detection device when the error detection device determines that the data read from the memory device are not error-free.

8. The method according to claim 7, which further comprises outputting a further interrupt request signal different from the previously-output interrupt-request signal when the error detection device ascertains that the data read from the memory device are not error-free during the execution of an interrupt service routine.

9. The method according to claim 7, which further comprises assigning interrupt request signals output successively with the error detection device to different interrupt vectors.

10. The method according to claim 9, which further comprises assigning at least one of the interrupt vectors to an interrupt request signal output with the error detection device dependent on the program to be interrupted.

11. The method according to claim 1, wherein the interrupt service routine executed after the occurrence of an error is a program at least partly conforming to the program interrupted by the interrupt service routine.

12. The method according to claim 1, wherein the interrupt service routine executed after the occurrence of an error is a program at least partly corresponding to the program interrupted or ended by the interrupt service routine.

13. A memory device system for storing data, comprising:

a memory device for storing data;

an error detection device reading the data from said memory device, checking whether the data are error-free, outputting a first interrupt request signal when the data are not error-free, and outputting a second interrupt request signal differing from the first output interrupt request signal when said error detection device ascertains that the data read from said memory device is not error-free during the execution of the interrupt service routine being executed in response to the first interrupt request signal.

* * * * *